Sept. 17, 1946.   J. F. PERFETTI ET AL   2,407,935
ELECTRICAL MACHINE
Filed May 25, 1944

INVENTORS.
John F. Perfetti,
Harold E. Waldron.
BY
Harness and Harris
ATTORNEYS.

Patented Sept. 17, 1946

2,407,935

UNITED STATES PATENT OFFICE 2,407,935

ELECTRICAL MACHINE

John F. Perfetti, Dearborn, and Harold E. Waldron, Detroit, Mich., assignors to Chrysler Corporation, Highland Park, Mich., a corporation of Delaware Application May 25, 1944, Serial No. 537,336

11 Claims. (Cl. 171—206)

This application relates to an assembly comprising laminations and conductors extending through them and to the method of carrying out the assembly. More specifically, it relates to a generator stator assembly comprising an annular core formed of laminations and conductors inserted in the laminations.

It has been known to provide constructions involving laminations provided with openings for conductors and with slots connecting an inner side or an outer side of the laminations with the openings. The slits perform an important magnetic or electric function, and they have served the incidental function of constituting inlets for the conductors to the openings in the laminations. In other words, the conductors have been inserted through the slits into the slots. This requires that they be of an appreciable width, and unless they are at least partially filled after the conductors are inserted, the efficiency of the laminations may be too low.

It has been proposed to insert the conductors endwise through the openings in the laminations, for this allows the slits to be kept at the desirable minimum width. However, the disadvantage has been that the ends of ths conductors had to bend after the assembly with the laminations, and this brought about too great a cost of manufacture.

We propose the use of a new arrangement of conductors that permits endwise insertion into the laminations and yet eliminates the costly bending of the ends of the conductors after they are in place in the lamination.

An object of the present invention is to provide improvements in an assembly involving laminations and conductors extending through the laminations. These laminations and conductors may constitute a stator assembly for a generator of alternating current. However, the use of the invention is not to be considered as so limited, for its principles may be employed to direct-current machines as well as to alternating-current machines, to motors as well as to generators, and to moving parts as well as to stationary parts, whether such parts are associated with motors or with generators.

Another object is to improve a method of assembling structures composed of laminations and conductors associated therewith.

Other objects will appear from the disclosure.

Figure 1:
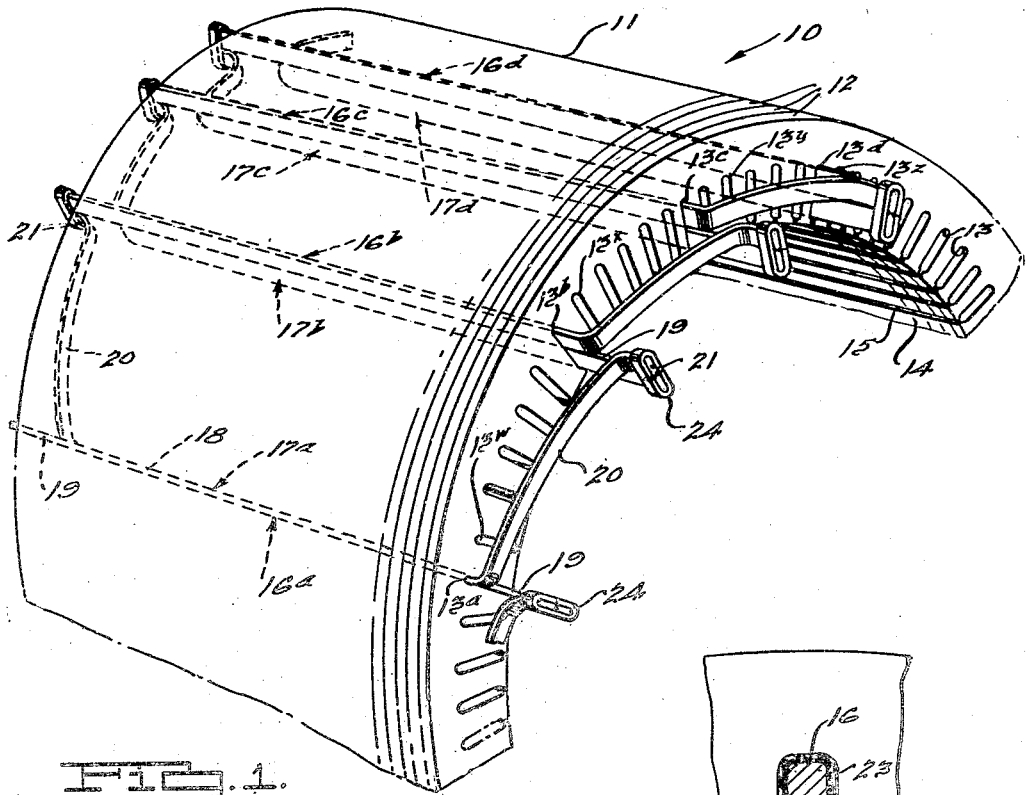
Fig. 1 is a fragmentary perspective view of a structure employing the principles of the present invention.
Figure 2:
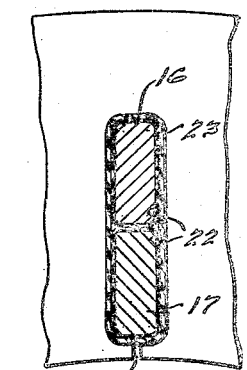
Fig. 2 is a fragmentary sectional view.

The reference character 10 designates a stator assembly that includes an annular core 11 formed of a plurality of flat annular laminations 12 laid one on the other. Each lamination 12 is provided, as indicated for the right-hand lamination of Fig. 1, with a plurality of elongated openings 13 circularly or arcuately arranged with respect to one another and with their lengths extending radially. The openings 13 are very near an inner surface 14 of the core 11 and are connected therewith by narrow slits 15. The openings 13 and slits 15 of each lamination 12 are alined with the openings and slits of the other laminations and constitute with them openings and slits extending from one end of the core 11 to the other end.

Figure 3:
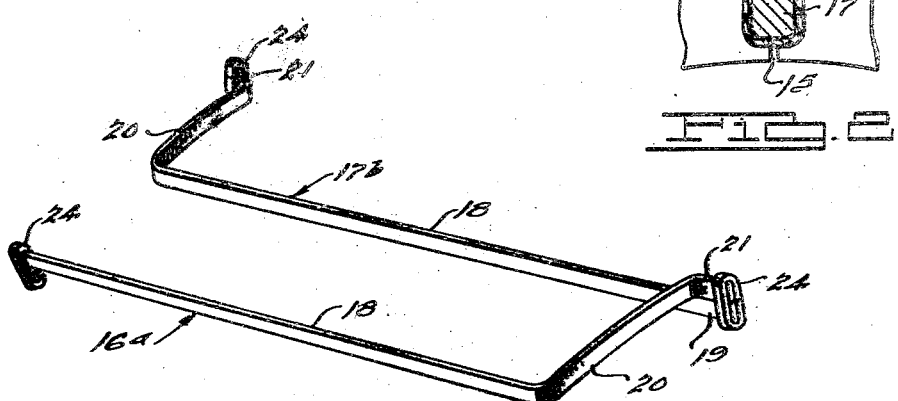
Fig. 3 is a perspective view showing two conductors associated with one another after the manner of the present invention.

Consider now four of the openings 13, designated as 13$^a$, 13$^b$, 13$^c$, and 13$^d$. They are spaced from one another by six openings. In the opening 13$^a$ are positioned two similar but reversely arranged conductors 16$^a$ and 17$^a$. Each has a straight end 18 alined with a straight body portion 19 and a bent end 20 extending out of alinement with and at a substantial angle to the body portion 19 and terminating in connecting portion 21 extending generally in the same direction as the body portion but displaced therefrom by an amount equal to the spacing between the slots 13$^a$ and 13$^b$ or 13$^b$ and 13$^c$. The conductor 16$^a$ is positioned at the outer end of the slot 13$^a$ with its bent end 20 extending from and across the near end of the core 11 and terminating in its connecting portion 21 in general alinement with the opening 13$^b$ and with its straight end extending from the far end of the core 11. The conductor 17$^b$, on the other hand, is positioned at the inner end of the slot 13$^a$ with its bent end 20 extending from and across the far end of the core 11 and terminating in its connection portion 21 in general alinement with the opening 13$^b$ and with its straight end extending from the near end of the core 11. In the openings 13$^b$, 13$^c$, and 13$^d$ there are positioned, respectively, conductors 16$^b$ and 17$^b$, 16$^c$ and 17$^c$, and 16$^d$ and 17$^d$, respectively arranged similarly to conductors 16$^a$ and 17$^a$. The conductors each have an insulating coating 22, which separates the conductors of a pair positioned in a given opening from one another electrically. There is a lining 23 of insulating material in each opening. As seen in Figs. 1 and 3, the connecting portion 21 on the bent end 20 of the conductor 16ᵃ is electrically connected to the straight end 19 on the conductor 17ᵇ through contact of these portions, they being free of insulation. A ring 24 embraces the portions and thereby maintains them in contact and aids the electrical connection. Similarly, the bent end of conductor 17ᵇ is connected electrically with the straight end of conductor 16ᶜ, and the bent end of conductor 16ᶜ, with the straight end of conductor 17ᵈ. Thus a conducting path is formed of conductors 16ᵃ, 17ᵇ, 16ᶜ, 17ᵈ. In a similar fashion a separatae conducting path is formed of conductors 17ᵃ, 16ᵇ, 17ᶜ, 16ᵈ. The paths may be continued around the core 11 as far as is electrically desirable. At certain points adjacent conductor parts formed of a straight end 19 and a connecting part 21 on a bent end 20 may be merely juxtaposed without being electrically connected if the requirements so dictate. Even though these parts are not joined, they are juxtaposed in order to maintain dynamic balance.

It will be understood that groups of conductors are similarly placed in the groups of openings between the openings 13ᵃ, 13ᵇ, 13ᶜ, and 13ᵈ. For example, consider the openings immediately to the right of openings 13ᵃ, 13ᵇ, 13ᶜ, and 13ᵈ, the former being designated as 13ʷ, 13ˣ, 13ʸ, and 13ᶻ. In each of these openings there may be two conductors, one with a bent end extending from the far end of the core 11, the other with a bent end entending from the near end of the core. As in the case of openings 13ᵃ, 13ᵇ, 13ᶜ, and 13ᵈ, the conductors will form two conducting paths.

An important feature of the present application is that each conductor has one straight end and one bent end. The straight ends enable the conductors to be inserted endwise through the openings on the core, the straight ends first. The bent end permits easy connection of each conductor with the straight end of another conductor. Since only one end of each conductor is bent, there need be no shaping of the conductors after they have been positioned in the openings in the core. This brings about a considerable saving in cost. Since the conductors are not inserted through the slots 15, they may be kept at the minimum width requisite for high electrical efficiency.

The assembly of the conductors in the laminations may be carried out in the following manner. All the conductors having bent ends to be located at one end of the core may be inserted. Thereafter the conductors having bent ends to be located at the other end of the core may be inserted. Then the ring connectors 24 are applied to the ends of the rings. Alternatively the two conductors for a certain opening may be inserted before the two conductors for another opening.

The assembly comprising the conductors and the core 11 as shown is adapted for use as the stator assembly of an alternating-current generator. The principles of the invention may be applied to direct-current machines as well as to alternating-current machines, to motors as well as to generators, and to moving parts as well as to stationary parts.

The intention is to limit the invention only within the scope of the appended claims.

We claim:

1. In combination, a core formed of a stack of laminations and having a plurality of openings extending through the stack, a first conductor positioned in a first opening in the stack and having a straight end protruding from one end of the stack and a bent end protruding from the other end of the stack, a second conductor positioned in a second opening of the stack and having a straight end protruding from the said other end of the stack and into proximity with the bent end of the first conductor and a second bent end protruding from the said one end of the stack, and means electrically connecting the bent end of the first conductor and the straight end of the second conductor.

2. In combination, a core formed of a stack of laminations and having a plurality of openings extending through the stack, a first conductor positioned in a first opening in the stack and having a straight end protruding from one end of the stack and a bent end protruding from the other end of the stack, a second conductor positioned in a second opening of the stack and having a straight end protruding from the said other end of the stack and into proximity with the bent end of the first conductor and a second bent end protruding from the said one end of the stack, means electrically connecting the bent end of the first conductor and the straight end of the second conductor, a third conductor positioned in the first opening and having a bent end protruding from the said one end of the stack, and a straight end protruding from the said other end of the stack, and a fourth conductor positioned in a third opening in the stack on the opposite side of the first opening from the second opening and having a straight end protruding from the said one end of the stack and a bent end protruding from the said other end of the stack into proximity with the straight end of the third conductor, and means electrically connecting the bent end of the fourth conductor and the straight end of the third conductor.

3. In combination, a core formed of a stack of laminations and having a plurality of openings extending through the stack, a first conductor positioned in a first opening in the stack and having a straight end protruding from one end of the stack and a bent end protruding from the other end of the stack, a second conductor positioned in a second opening of the stack and having a straight end protruding from the said other end of the stack and into proximity with the bent end of the first conductor and a second bent end protruding from the said one end of the stack, means electrically connecting the bent end of the first conductor and the straight end of the second conductor, a third conductor positioned in the first opening and having a bent end protruding from the said one end of the stack and a straight end protruding from the said other end of the stack, and a fourth conductor positioned in the second opening and having a bent end protruding from the said other end of the stack and a straight end protruding from the said one end of the stack into proximity with the bent end of the third conductor, and means electrically connecting the bent end of the fourth conductor and the straight end of the third conductor.

4. In combination, a core formed of a stack of laminations and having first, second, third, and fourth openings arranged in numerical order, a first conductor positioned in the first slot and having a straight end protruding from one end of the stack and a bent end extending from the other end of the stack to a region in general alinement with the second hole, a second conductor positioned in the second slot and having a straight end extending from the said other end of the stack into proximity with the bent end of the first conductor and a bent end extending from the said one end of the stack to a region in general alinement with the third opening, means electrically connecting the bent end of the first conductor and the straight end of the second conductor, a third conductor positioned in the third slot and having a straight end extending from the said one end of the stack into proximity with the bent end of the second conductor and a bent end extending from the said other end of the conductor to a region in general alinement with the fourth opening, means electrically connecting the bent end of the second conductor and the straight end of the third conductor, a fourth conductor positioned in the fourth slot and having a straight end extending from the said other end of the stack into proximity with the bent end of the third conductor and a bent end extending from the said one end of the stack, a fifth conductor positioned in the first opening and having a straight end protruding from the said other end of the stack and a bent end extending from the said one end of the stack to a region of general alinement with the second opening, a sixth conductor positioned in the second opening and having a straight end extending from the said one end of the stack into proximity with the bent end of fifth conductor and a bent end extending from the said other end of the stack to a region of general alinement with the third opening, means electrically connecting the bent end of the fifth conductor and the straight end of the sixth conductor, a seventh conductor positioned in the third opening and having a straight end extending from the said other end of the stack into proximity with the bent end of the sixth conductor, means electrically connecting the bent end of the sixth conductor and the straight end of the seventh conductor, an eighth conductor positioned in the fourth slot and having a straight end extending from the said one end of the stack into proximity with the bent end of the seventh conductor and a bent end extending from the said other end of the stack, and means electrically connecting the bent end of the seventh conductor and the straight end of the eighth conductor.

5. In combination, an annular core formed of a stack of laminations and having a plurality of openings extending through the stack adjacent the inner side thereof and narrow slits connecting the openings and the inner side of the stack, a first set of conductors positioned in a certain alternate group of openings, one conductor to an opening, each conductor having a straight end extending from one end of the stack and a bent end extending from the other end of the stack in a certain direction out of alinement with its opening to a region of general alinement with another opening in the stack, the said other opening and similar openings constituting a second alternate group of openings interspaced with the first group of openings, a second set of conductors positioned in the second group of openings, one conductor to an opening, each conductor having a straight end extending from the said other end of the stack into proximity with the bent end of a conductor of the first set and a bent end extending from the other end of the stack in the said certain direction into proximity with the straight end of a conductor of the first set, a third set of conductors positioned in the first group of openings, one conductor to an opening, each conductor having a straight end extending from the said other end of the stack and a bent end extending from the one end of the stack to a region of general alinement with an opening of the second group, a fourth set of conductors positioned in the second group of openings, one conductor to an opening, each conductor having a straight end extending from the said one end of the stack and a bent end extending from the said other end of the stack in the said certain direction into general proximity with the straight end of a conductor of the third set, and means electrically connecting at least some of the adjacent pairs of bent and straight ends of the conductors.

6. A stator assembly for an alternating-current generator, comprising a core formed of a stack of laminations and having a plurality of openings extending through the stack, a first set of conductors positioned in the openings, one conductor to an opening, and having straight ends protruding from one end of the stack and bent ends protruding from the other end of the stack, each bent end extending in the same direction as the other bent ends of the conductors of the first group out of alinement with the opening containing the conductor having the particular bent end to a region of general alinement with the opening containing an adjacent conductor of the first set, a second set of conductors positioned in the openings, one conductor to an opening, and having straight ends protruding from the said other end of the stack and bent ends protruding from the said one end of the stack, each bent end extending in the same direction as the other bent ends of the conductors of the second set out of alinement with the opening containing the conductor having the particular bent end into adjacency with the straight end of an adjacent conductor of the first set and a straight end extending into proximity with the bent end of an adjacent conductor of the first set, and means electrically connecting at least some of the pairs of the proximate bent and straight ends of the conductors.

7. A method of applying conductors to openings in a core composed of a stack of laminations to form a generator stator assembly, comprising providing a plurality of conductors, each having a straight end extending in alinement with a main body portion and a bent end extending out of alinement with the main body portion, inserting the straight ends of a first set of the conductors in the openings in the stack at one end thereof and moving the first set of the conductors endwise through the openings so as to cause the body portion of each of the first set of the conductors to occupy an opening and the straight end and the bent end to extend, respectively, from the other end of the stack in alinement with the opening and from the said one end of the stack out of alinement with the opening to a region of general alinement with an adjacent opening, inserting the straight ends of a second set of the conductors at the said other end of the stack in the openings occupied by the first set of the conductors and moving the second set endwise through the openings to cause the body portion of each conductor of the second set to occupy an opening and the straight end and the bent end to extend, respectively, from the said one end of the stack in alinement with the opening into adjacency with a bent end of a conductor of the first set, and from the said other end of the stack out of alinement with the opening into adjacency with a bent end of a conductor of the first set, and electrically connecting at least some of the pairs of the adjacent straight and bent ends of the conductors.

8. A method of applying conductors to openings in a core composed of a stack of laminations to form a generator stator assembly, comprising providing a plurality of conductors, each having a straight end extending in alinement with a main body portion and a bent end extending out of alinement with the main body portion, inserting the straight end of a first conductor in a first opening in the stack at one end thereof and moving the first conductor endwise through the first opening so as to cause the body portion to occupy the first opening and the straight end and the bent end to extend, respectively, from the other end of the stack in alinement with the first opening and from the said one end of the stack out of alinement with the first opening to a region of general alinement with a second opening, inserting the straight end of a second conductor in the first opening at the said other end of the stack and moving the second conductor endwise through the first opening so as to cause the body portion thereof to occupy the first opening and the straight end and the bent end to extend, respectively, from the said one end of the stack in alinement with the first opening and from the said other end of the stack out of alinement with the first opening to a region of general alinement with the second opening, inserting the straight end of a third conductor in the second opening at the said one end of the stack and moving the third conductor endwise through the second opening so as to cause the body portion to occupy the second opening and the straight end and the bent end to extend, respectively, from the said other end of the stack into adjacency with the bent end of the second conductor and from the said one end of the stack out of alinement with the second opening to a region of general alinement with a third opening, inserting the straight end of a fourth conductor in the second opening at the said other end of the stack and moving the fourth conductor endwise through the second opening so as to cause the body portion to occupy the second opening and the straight end and the bent end to extend, respectively, from the said one end of the stack into adjacency with the bent end of the first conductor and from the said other end of the stack out of alinement with the second opening to a region of general alinement with the third opening, and electrically connecting at least some of the pairs of adjacent bent and straight ends of the conductor.

9. In combination, a core formed of a stack of laminations and having a plurality of openings extending through the stack, a first set of conductors positioned in the openings one to an opening and at one end of the slot and having straight ends protruding from one end of the stack and bent ends protruding from the other end of the stack, each bent end extending in the same direction as the other bent ends of the conductors of the first set out of alinement with the opening containing the conductor having the particular bent end to a region of general alinement with the opening containing an adjacent conductor of the first set, a second set of conductors positioned in the openings one to an opening and at the other end of the slot and having straight ends protruding from the said other end of the stack and bent ends protruding from the said one end of the stack, each bent end extending in the same direction as the other bent ends of the conductors of the second set out of alinement with the opening containing the conductor having the particular bent end into adjacency with the straight end of an adjacent conductor of the first set and a straight end extending into proximity with the bent end of an adjacent conductor of the first set, and means electrically connecting at least some of the pairs of the proximate bent and straight ends of the conductors.

10. In combination, a core formed of a stack of laminations and having a plurality of elongated openings arcuately arranged with the length of the openings extending radially and narrow slits at one end of the openings, a first set of conductors positioned in the openings one to an opening and at the radially inner end of the slot and having straight ends protruding from one end of the stack and bent ends protruding from the other end of the stack, each bent end extending in the same direction as the other bent ends of the conductors of the first group out of alinement with the opening containing the conductor having the particular bent end to a region of general alinement with the opening containing an adjacent conductor of the first set, a second set of conductors positioned in the openings one to an opening and at the other end of the slot and having straight ends protruding from the said other end of the stack and bent ends protruding from the said one end of the stack, each bent end extending in the same direction as the other bent ends of the conductors of the second set out of alinement with the opening containing the conductor having the particular bent end into adjacency with the straight end of an adjacent conductor of the first set and a straight end extending into proximity with the bent end of an adjacent conductor of the first set, and means electrically connecting at least some of the pairs of the proximate bent and straight ends of the conductors.

11. In combination, an annular core formed of a stack of annular laminations and having a plurality of elongated openings extending through the stack and being arcuately arranged with the lengths of the openings extending radially and narrow slits connecting the radially inner end of the openings and the inner side of the stack, a first set of conductors positioned in the openings one to an opening and at the radially inner end of the slot and having straight ends protruding from one end of the stack and bent ends protruding from the other end of the stack, each bent end extending in the same direction as the other bent ends of the conductors of the first group out of alinement with the opening containing the conductor having the particular bent end to a region of general alinement with the opening containing an adjacent conductor of the first set, a second set of conductors positioned in the openings one to an opening and at the radially outer end of the slot and having straight ends protruding from the said other end of the stack and bent ends protruding from the said one end of the stack, each bent end extending in the same direction as the other bent ends of the conductors of the second set out of alinement with the opening containing the conductor having the particular bent end into adjacency with the straight end of an adjacent conductor of the first set and a straight end extending into proximity with the bent end of an adjacent conductor of the first set, and means electrically connecting at least some of the pairs of the proximate bent and straight ends of the conductors.

JOHN F. PERFETTI.
HAROLD E. WALDRON.